March 28, 1933.   F. A. TALBOT   1,902,919
COUPLING
Filed June 28, 1928
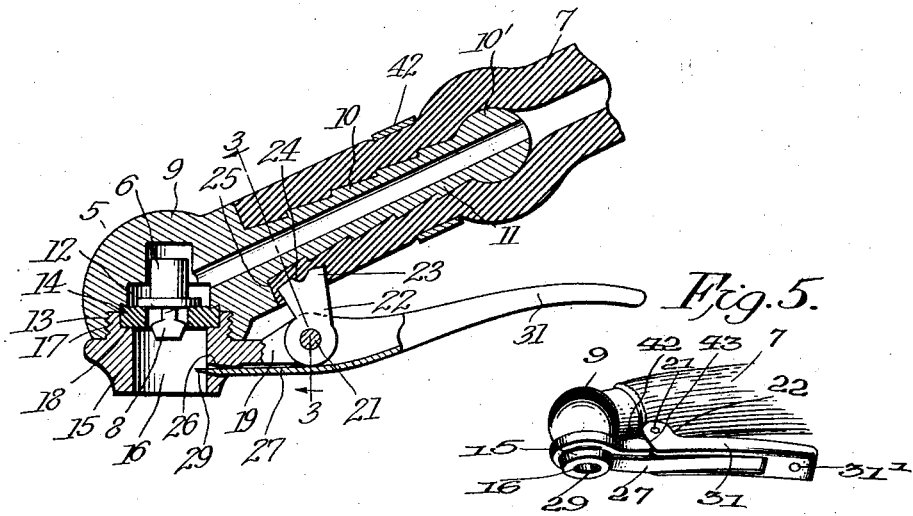
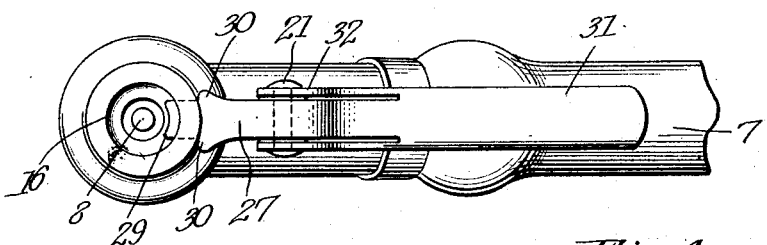
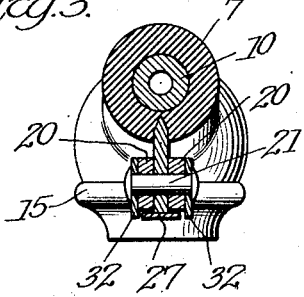
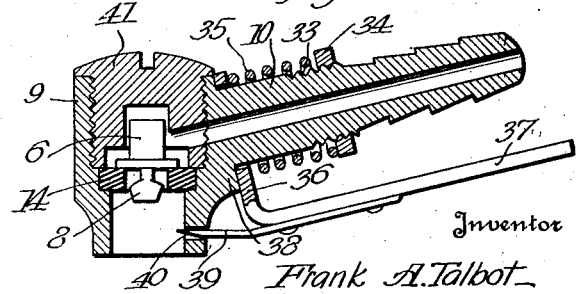
Inventor
Frank A. Talbot Patented Mar. 28, 1933

1,902,919

UNITED STATES PATENT OFFICE

FRANK A. TALBOT, OF GREENVILLE, SOUTH CAROLINA

COUPLING

Application filed June 28, 1928. Serial No. 288,967.

This invention relates to new and useful improvements in couplings, and more particularly to a type which is well adapted for temporarily connecting an air hose to an inflating nipple of an automobile tire so as to relieve the operator of the necessity of manually holding the device upon the inflating nipple while inflating the tire.

An important object of the invention is to provide the coupling with a simple and inexpensively manufactured locking device in the nature of a flexible resilient locking member, which is so arranged that the mere operation of gripping the device to apply it to, or remove it from the tire nipple or stem, causes the locking member to be operated.

Another important object of the invention is to provide a device of the above character in the form of an attachment to existing types of tire inflating nozzles, and to provide means for locking the attachment in cooperative relation to the nozzle to prevent its accidental displacement therefrom.

A still further object of the invention is to provide a device of the foregoing character and arrange the locking member relative to the means for locking the attachment to the nozzle, whereby they cooperate in causing the respective elements to perform their respective functions.

Other objects and advantages of the invention will become apparent during the course of the following description.

In the accompanying drawing, forming a part of the description, and wherein like numerals are employed to designate like parts throughout the several views, Figure 1 is a longitudinal section through the coupling.

Figure 2 is a bottom plan of the same.

Figure 3 is a transverse section taken on the line 3—3 of Figure 1.

Figure 4 is a longitudinal section of a modified form of the invention, and

Figure 5 is a perspective view of a modification of the form shown in Figure 1.

Referring now in detail to the accompanying drawing, the numeral 5 designates an existing type of tire inflating nozzle which must be manually held upon the tire stem to retain its valve 6 open and permit passage of air under pressure to pass from the tubing 7 through the nozzle 5 into the tire, it being understood that the valve 6 is provided with a depending extension 8, which is designed to automatically depress or open the usual valve of a tire stem upon application of the nozzle thereto. This particular type of nozzle consists of a substantially hemi-spherical body or head 9 having a reduced exteriorly roughened or corrugated nipple extension 10 terminating in an enlarged free end 10', over which the rubber air hose 7 is pushed and a solid clamping ring 42 is forced over the end of the hose to a point adjacent the enlarged end 10' to form a joint between the hose and the nipple which will withstand great pressures. This nipple 10 extends at an angle of approximately 30° from the head 9, and is provided with a longitudinally extending air passage 11, which extends into the center of the head 9 to communicate with a recess 12. The bottom of this head 9 has a circular recess 13, which is provided with threads to receive an exteriorly threaded extension of a collar, not shown, which is adapted to abut a rubber gasket 14 arranged within the recess 12 and forming a seat for the valve 6 in the usual manner. In place of this ordinary collar, not shown, for retaining the gasket within the nozzle to accomplish the purposes thereof, I provide an attachment for the existing type of tire inflating nozzle, in the form of a coupling or locking device.

This coupling or locking device assumes the form of a body 15 having a recess or bore 16 extending entirely therethrough. The body 15 is provided with an exteriorly screw threaded end 17 adapted to be received in the threaded recess of the nozzle 9, and is equipped with an interior annular shoulder 18 adapted to engage the rubber gasket 14 and retain it in its usual position within the nozzle 9.

The attachment body 15 is provided with a lateral extension 19, which is adapted to be disposed under the nipple 10 and lower end of the rubber hose 7 when the attachment is screwed up tight into the nozzle 9. The free end of the extension 19 is rounded and slotted or bifurcated to provide a pair of spaced ears 20, which are provided with aligned apertures to receive a pivot pin 21, in the form of a rivet or otherwise. Upon this pivot pin and between the ears 20 is pivotally mounted a locking dog 22 provided with a slightly curved sharpened transverse free edge 23, having a V-shaped notch 24 cut therein and a sharpened forward edge 23'. The pivot 21 being arranged beneath the lower end of the rubber hose 7, it will be obvious that the locking dog 22 may be swung upwardly and forced so that its sharpened edge 23' and 23 will cut into the rubber hose to an extent which may be limited by the abutment of the locking dog with the shoulder 25 formed between the head 9 and nipple 10. This position of the locking dog serves to prevent the attachment body 15 from becoming unscrewed and detached from the nozzle 9, but it will be obvious that the locking dog may be swung upon its pivot to become disengaged from the rubber hose, by a suitable instrument in case it is desired to remove the attachment 15 from the nozzle for replacement of the gasket 14 or the valve 6 whenever necessary. When the locking dog is in locked position, as shown in Figure 1, it will be noted that the hose material will enter the notch 24 to augment another feature which will be presently described in preventing accidental unlocking movement of the dog.

Beneath the lateral extension 19, the attachment body 15 is provided with a laterally extending recess or opening 26 extending entirely through the depending flange of the attachment body from the exterior to the bore 16, and is, therefore, arranged at substantially right angles to the longitudinal axis of the bore, but is slightly inclined upwardly and inwardly of the bore as clearly shown in Figure 1 to slidably receive and produce slight friction with the free end of a flexible and resilient locking blade 27, preferably constructed of spring steel. The free end of this locking blade is sharpened as at 28 into substantially a cutting edge, which is adapted to normally project into the bore 16 of the attachment body to grip the side of a tire stem or nipple, whether threaded or smooth. In order to positively limit the inward projection of the free end of the locking blade into the bore 16, the blade is provided with a laterally extending projection or shoulder 30 on each longitudinal edge thereof adapted to abut the exterior of the depending flange of the attachment body 15.

This flexible locking blade 27 forms in one embodiment of the invention, shown in Figure 1, an integral longitudinal extension of an actuating handle 31, which is provided with a pair of spaced parallel apertured attachment ears 32 for pivotal support upon the pivot pin 21, outside of the ears 20 of the extension 19. In Figure 2, it will be noted that the flexible locking blade 27 extends to a point well to the rear of the pivot 21, and is free of any restrictive action or connection with the handle back to this point. Substantially intermediate the ends of the locking blade 27, it is engaged with the rounded undersides of the ears 20 and the rounded end of the locking dog 21, so that when the actuating handle 31 is moved toward the air hose 7, the locking blade is caused to flex, due to its being bowed below and around the pivot, with the result that the biting end of the locking blades is withdrawn or retracted through the opening 26 from the bore 16. In this position, the coupling may be readily applied to a tire stem or other device to be coupled by guiding the stem into the bore 16, after which the pressure upon the actuating handle 21 is released, which permits the resilient locking blade 27 to spring back to its normal position and in doing so, causes its free biting edge 29 to move through the opening 26 into the bore 16 to engage with the stem or other object placed in the bore, so that the device becomes locked upon the stem. In this manner, it is unnecessary for the operator to manually hold the inflating nozzle upon the stem while the tire is being inflated, and when the invention is employed in connection with tire inflating machines from which a predetermined pressure can be obtained, it is obvious that a single operator can simultaneously inflate a large number of tires without the necessity of individually holding the tire inflating nozzle upon the stem of each tire stem. This locking attachment can also be used to advantage on the inflating nozzles of ordinary hand pumps, and has a wide variety of uses as simply a coupling device.

In the embodiment of the invention shown in Figure 5, the construction of the device is practically the same as the construction shown in Figure 1, and accordingly, corresponding numerals are employed to designate corresponding parts of the two embodiments. The essential differences between the two constructions are matters of form and not substance, and reside in making the flexible resilient locking blade 27 separate from the actuating handle 31, instead of integral with it, as shown in Figure 1, and extending the locking blade between the elongated sides or ears 32 of the handle, so that it may be fastened by a rivet 31' or otherwise to the underside of the free end of the actuating handle.

This construction permits of the handle 31 being constructed of rust-proof material, such as brass or the like, while the material of the locking blade 27 may be of a flexible resilient nature.

Another distinction of the construction shown in Figure 5 over that shown in Figure 1, is the fact that the means employed for limiting the projection of the locking blade 27 into the bore 16 and the outward swinging movement of the actuating handle 31, is obtained by providing shoulders 42 upon opposite sides of the lateral extension 19 adjacent the pivot 21 to cooperate with shoulders or abutments 43 provided on the ears 32 of the actuating handle, so that in normal position, the shoulders 43 of the handle abut the shoulders 42 of the lateral extension 19 to limit outward swinging movement of the actuating handle and projection of the locking blade 27 into the bore 16. It will be obvious that these abutment shoulders 42 and 43 serve the same purpose as the shoulders 30 cooperating with the flange or shoulder of the body 15, the only distinction being that in one case the abutment shoulders are formed directly upon the locking blade 27, whereas in the form shown in Figure 5, the abutment shoulders are provided directly upon the actuating lever 31, so that indirectly the shoulders 30 may be said to be arranged on the actuating means or lever 31 inasmuch as the locking blade 27 in the form shown in Figures 1 and 2, forms an integral part of the handle.

The operation of the embodiment shown in Figure 5 is the same as that shown in Figure 1.

In the modification shown in Figure 4, the invention is illustrated as applied to a different type of tire inflating nozzle in which the nipple 10 is provided between its ends with exterior screw threads 33 adapted to receive an interiorly threaded washer 34 forming an abutment for one end of a coil spring 35 which surrounds the nipple and has its other end abutting a substantially right angled apertured arm 36 of an actuating handle 37 which is normally disposed beneath the nipple 10 and substantially parallel therewith. The apertured arm 36 of this handle is provided with an opening slightly larger than the diameter of the nipple 10 to be received thereon and is capable of slight tilting movement with relation thereto. The arm 36 normally abuts a shoulder 38 provided at the juncture of the head 9 and nipple 10, in order to limit the inward movement of the flexible resilient locking blade 39 through the recess or opening 40 corresponding to the recess 26 of the modification shown in Figure 1. The locking blade 39 has its free end provided with a knife edge, and is preferably constructed of spring steel so as to be flexible, and its outer end is riveted or otherwise secured to the handle 37 as shown, in order that movement of the handle toward the nipple and hose will cause the locking blade to flex and slide outwardly through the opening 40.

The type of nozzle head or body 9 shown in Figure 4, is suitably recessed for the reception of the tire stem and for the maintenance and operation of the valve 6 and rubber valve seat 14 therein, but instead of the rubber gasket 14 being removably retained in the body by means of a lower collar, such as described in connection with the other embodiment, this gasket is retained within the body by means of an exteriorly screw threaded plug 41 inserted from the relative top of the body, as shown, and having suitable recesses to permit free operation of the valve 6 and passage of air from the nipple 10 into the body 9 and past the valve when it is raised from its seat by engagement with the valve stem of a tire nipple.

In the embodiments of my invention shown in Figures 1 and 5, it will be seen that the intermediate portion of the locking blade 27, normally bears against the locking dog 22 and, consequently, exerts a force thereon which has a tendency to force the dog into firmer frictional contact with the pivot pin 21, which assists in retaining the dog in locked or unlocked positions.

Various changes in the size, shape and arrangement of parts may be resorted to without departing from the spirit of the invention or the scope of the appended claims.

I claim:—

1. A pump coupling or the like comprising a body portion having a bore, a flexible locking member slidable into said bore and normally extending therein, and means for flexing said member to slide the same outwardly in said bore.

2. A pump coupling or the like comprising a body portion having a bore, a flexible resilient locking member slidable into said bore in a direction at right angles to the longitudinal axis of said bore and normally extending therein, and an actuating member movable at substantially right angles to the direction of movement of said locking member for flexing the latter to slide the same outwardly in said bore.

3. A pump coupling or the like comprising a body portion having a bore, a flexible locking member slidable into said bore, and a pivotally mounted actuating member connected to said locking member, movement of said actuating member serving to flex the locking member for sliding the same outwardly in said bore.

4. A pump coupling or the like comprising a body portion having a bore, a flexible locking member slidable into said bore, and normally arranged in locking position, actuating means for flexing said locked member to slide the same in said bore, and stop means for limiting the movement of said actuating means.

5. A pump coupling or the like comprising a recessed body, a flexible resilient locking member slidable in said recess and normally maintained in locking position by its inherent resilience, and actuatig means for flexing said locking member to slide the same in said recess, said locking member serving to normally retain said actuating means in a predetermined position.

6. A pump coupling or the like comprising a recessed body having a stop shoulder, an actuating handle pivotally connected to said body, a movable abutment, a flexible resilient locking blade slidable in said recess and normally disposed in locking position, and said locking blade being connected to said handle and normally retaining said movable abutment in engagement with said stop shoulder.

7. A pump coupling or the like comprising a body portion having a bore, a flexible resilient locking member slidable into said bore, and a pivotally mounted actuating member connected to said locking member for flexing the same over the pivot of said actuating member to slide the locking member in said bore.

8. A pump coupling or the like comprising a recessed body having a lateral extension, an actuating member pivoted to said extension, and a flexible resilient locking blade having one end slidable in said recess and its other end connected to said actuating member, and its intermediate portion engageable with said extension.

9. A pump coupling or the like comprising a recessed body having a lateral extension, an actuating member having a forked portion straddling said extension and pivotally connected thereto, and a flexible resilient locking blade having one end slidable in said recess, its other end connected to said actuating member and its intermediate portion engageable with the end of said extension.

10. In combination with an air hose nozzle head having an inlet nipple and hose connection arranged at an angle to said nozzle head, said head having an outlet port disposed at an angle to said inlet nipple, a flexible locking blade slidable in said outlet port at substantially right angles to the longitudinal axis thereof, and an actuating lever for said locking blade arranged to be simultaneously gripped with the nozzle when applying it to the stem and when so gripped causes said locking blade to flex and automatically move to unlocked position.

11. A locking attachment for air hose couplings and the like comprising a body having a bore and a lateral opening extending into said bore, a flexible resilient locking member slidable in said lateral opening and normally extending therein, and means for flexing said member to slide the same in said opening.

12. An inflating coupling comprising a head having a threaded bore, a part arranged at an angle to said bore, a member threadedly engaging in said bore, means for locking said coupling to a valve stem or the like, and cooperating means on said member and the angularly disposed part of the coupling for preventing accidental unscrewing of the member from the threaded bore.

13. A locking attachment for air hose nozzles comprising a member threaded for engagement with said nozzle, means for locking said member to a valve stem, and means for penetrating said air hose for preventing accidental unscrewing of said member from said nozzle.

14. A locking attachment for air hose nozzles comprising a member threaded for engagement with said nozzle, means for locking said member to a valve stem, and a movable element mounted on said member and having a cutting edge for engagement with said air hose.

15. A locking attachment for air hose nozzles comprising a member threaded for engagement with said nozzle, a movable member mounted upon said member for engagement with said air hose for preventing accidental unscrewing of said member from said nozzle, and a flexible resilient locking blade for locking said attachment to a valve stem and being engageable with said movable member to retain it engaged with said air hose.

16. A pump coupling or the like comprising a recessed body having a lateral extension, an actuating member pivoted to said extension, a locking dog mounted on the pivot of said actuating member, and a flexible resilient locking blade having one end slidable in said recess, its other end connected to said actuating member, and its intermediate portion engaged with said pivoted locking dog.

In testimony whereof I have hereunto set my hand.

FRANK A. TALBOT.